(12) United States Patent
Leonardi et al.

(10) Patent No.: US 11,742,708 B2
(45) Date of Patent: Aug. 29, 2023

(54) IN SLOT COOLING ENHANCEMENT FOR COATED STATOR

(71) Applicant: Ford Global Technologies, LLC, Dearborn, MI (US)

(72) Inventors: Franco Leonardi, Dearborn Heights, MI (US); Man Prakash Gupta, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 198 days.

(21) Appl. No.: 17/143,951

(22) Filed: Jan. 7, 2021

(65) Prior Publication Data

US 2022/0216743 A1 Jul. 7, 2022

(51) Int. Cl.
*H02K 1/16* (2006.01)
*H02K 3/48* (2006.01)
*H02K 1/20* (2006.01)

(52) U.S. Cl.
CPC ............ *H02K 1/165* (2013.01); *H02K 1/20* (2013.01); *H02K 3/48* (2013.01)

(58) Field of Classification Search
CPC ............ H02K 1/165; H02K 1/20; H02K 3/24; H02K 3/48; Y02T 10/64
See application file for complete search history.

(56) References Cited

U.S. PATENT DOCUMENTS

| | | | |
|---|---|---|---|
| 9,331,553 B2 | 5/2016 | Mayor et al. | |
| 10,135,319 B2 | 11/2018 | Hanumalagutti et al. | |
| 2017/0267055 A1 | 9/2017 | Hanumalagutti et al. | |
| 2018/0254673 A1* | 9/2018 | Koizumi | H02K 3/48 |
| 2021/0126511 A1* | 4/2021 | Coppola | H02K 7/006 |

FOREIGN PATENT DOCUMENTS

| | | | | |
|---|---|---|---|---|
| DE | 102017213662 A1 * | 2/2019 | | |
| DE | 102020109482 A1 | 10/2021 | | |
| EP | 1168571 A2 * | 1/2002 | | H02K 3/22 |
| EP | 1168571 A2 | 1/2002 | | |
| JP | 2017041916 A | 2/2017 | | |

* cited by examiner

*Primary Examiner* — Naishadh N Desai
(74) *Attorney, Agent, or Firm* — David B. Kelley; Brooks Kushman P.C.

(57) ABSTRACT

A stator includes a core and an over-molded midsection arranged to define a plurality of slots, and a plurality of conductors wound within the slots. Portions of the midsection immediately adjacent to the slots define a plurality of protrusions disposed on opposite long faces of at least some of the slots. The protrusions extend into the at least some of the slots and between some of the conductors to establish a gap between the some of the conductors and to direct coolant between the some of the conductors.

14 Claims, 7 Drawing Sheets

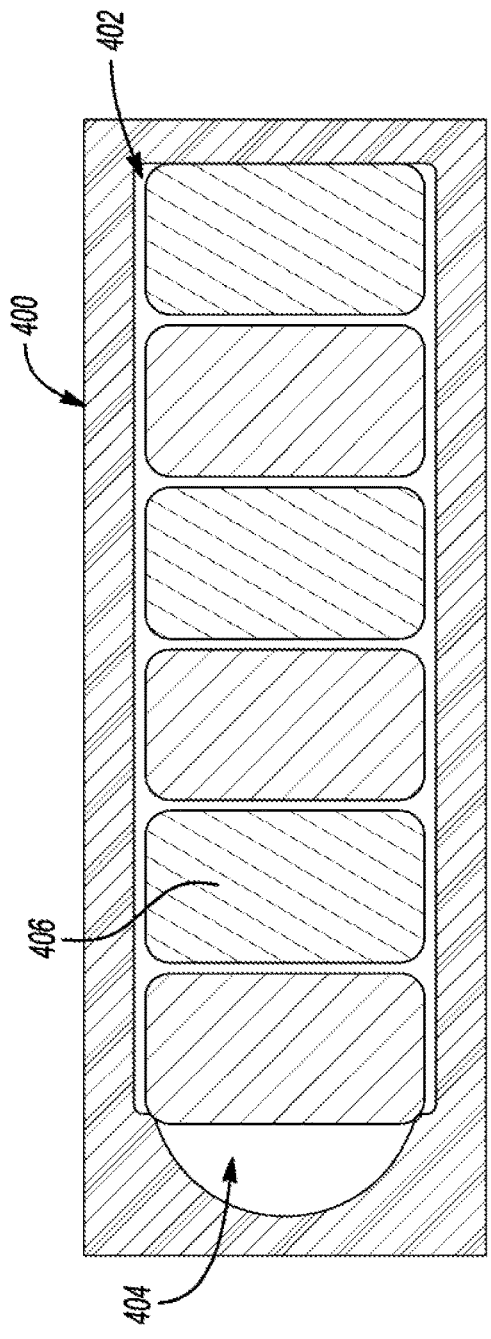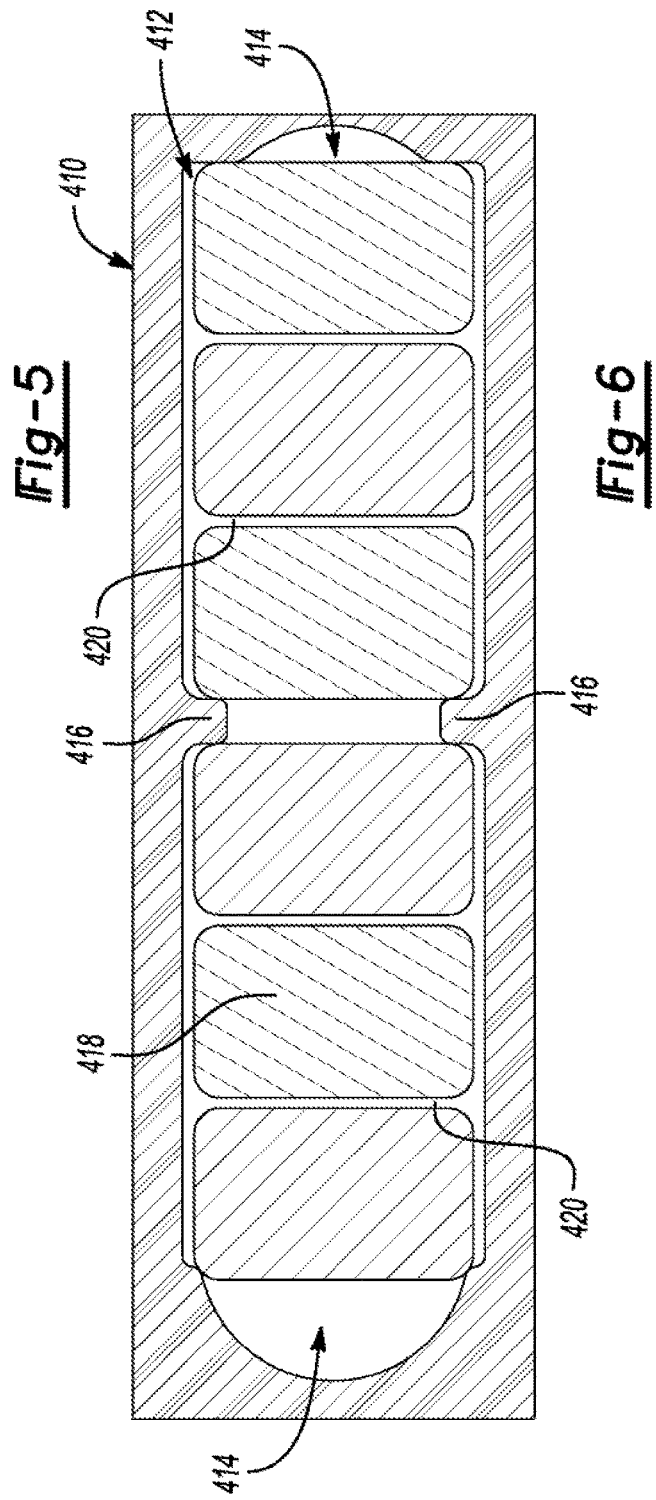

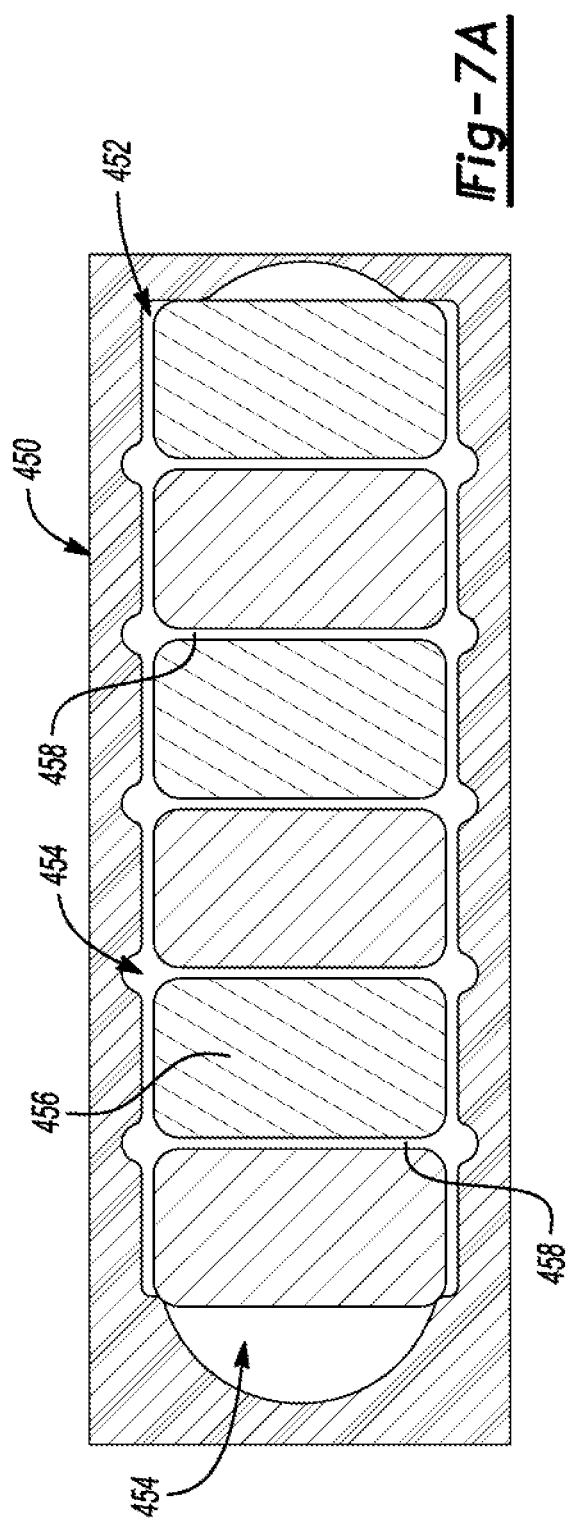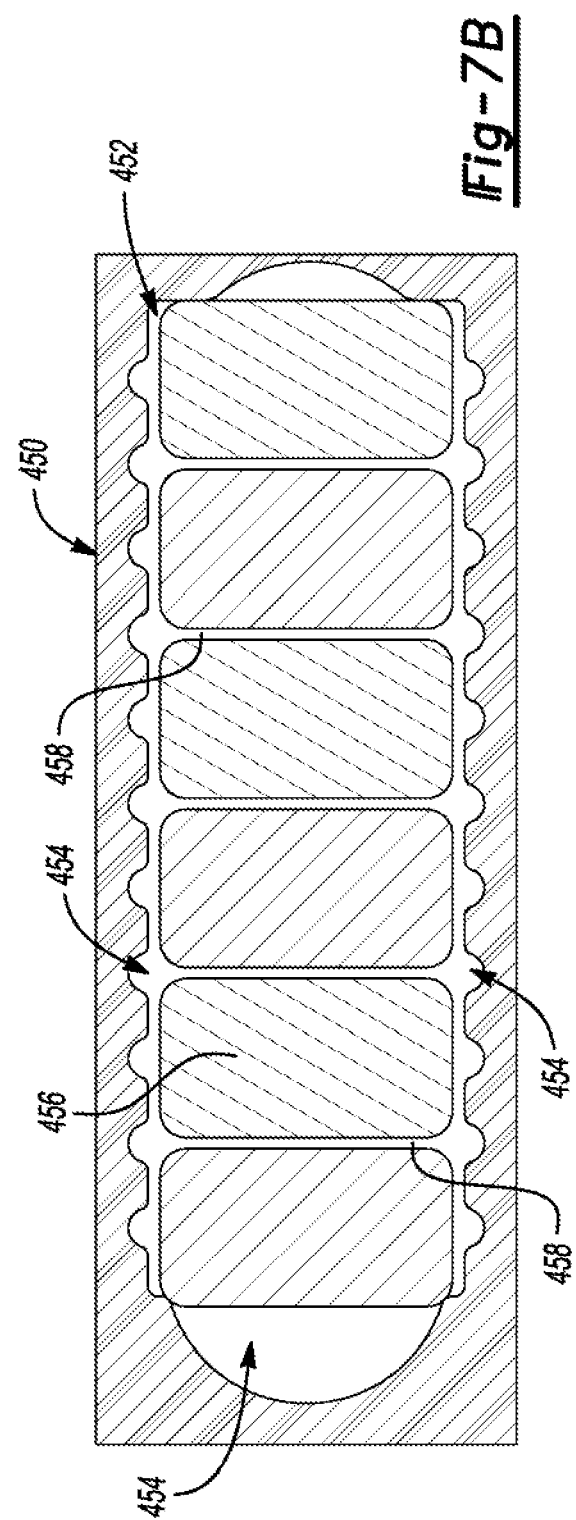

IN SLOT COOLING ENHANCEMENT FOR COATED STATOR

TECHNICAL FIELD

The present disclosure relates to a thermal management assembly for an electric machine of an electrified vehicle.

BACKGROUND

Extended drive range technology for electric vehicles, such as battery electric vehicles and plug in hybrid vehicles, continually increases demands on electric machines used for vehicle propulsion. Specifically, achieving increased driving ranges may require traction batteries and electric machines to have higher power outputs and associated thermal management systems. As the power output of electric machines increases to achieve extended driving ranges, demand for efficient heat removal technology may also increase.

SUMMARY

An electric machine has a stator including a core and an over-molded midsection arranged to define a plurality of slots, and a plurality of conductors wound within the slots. The portions of the midsection immediately adjacent to the slots define a plurality of protrusions disposed on opposite long faces of at least some of the slots. The protrusions extend into the at least some of the slots and between some of the conductors to establish a gap between the some of the conductors and to direct coolant between the some of the conductors.

A stator includes a core and an over-molded midsection. The core and the over-molded midsection are arranged to define a plurality of slots. The stator further includes a plurality of conductors wound within the slots. Portions of the midsection immediately adjacent to the slots define at least one groove, disposed on at least one long face of at least one of the slots, extending away from the conductors and toward the core to facilitate coolant flow.

A stator includes a core and an over-molded midsection. The core and the over-molded midsection are arranged to define a plurality of slots. The stator further includes a plurality of conductors wound within the slots. Portions of the midsection immediately adjacent to the slots define at least one groove, disposed on at least one short face of at least some of the slots, extending away from the conductors and toward the core.

BRIEF DESCRIPTION OF THE DRAWINGS

FIG. 5 is an exploded view of an exemplary stator slot with transfer molded epoxy having a groove feature.

FIG. 6 is an exploded view of an exemplary stator slot with transfer molded epoxy having both groove and protrusion features.

FIG. 7A is an exploded view of an exemplary stator slot with transfer molded epoxy having a plurality of groove features.

FIG. 7B is an exploded view of an exemplary stator slot with transfer molded epoxy having a plurality groove features.

DETAILED DESCRIPTION

Figure 1:
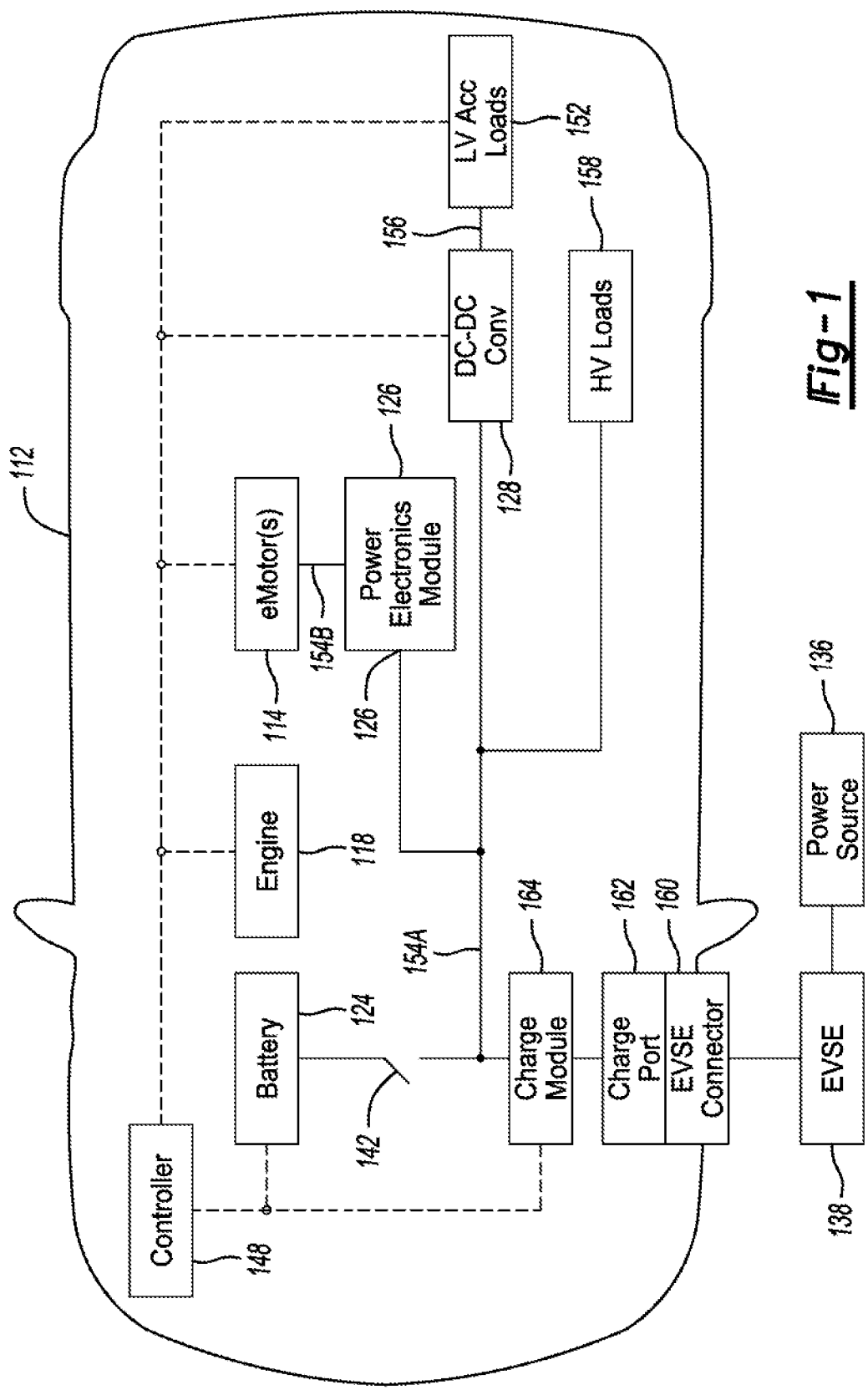
FIG. 1 is a schematic diagram of an example electric vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

Spatially relative terms, such as "top," "bottom," "inner," "outer," "beneath," "below," "lower," "above," "upper," "front," "back," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Vehicles that use a traction motor drive for propulsion are referred to as electric vehicles (EV). There are three main classes of electric vehicles. These three classes, which are defined by the extent of their electricity consumption, are namely: Battery Electric Vehicles (BEV), Hybrid Electric Vehicles (HEV), and Plug-in Hybrid Electric Vehicles (PHEV). Battery electric vehicles generally use an external electrical grid to recharge their internal battery and power their electric motors. Hybrid electric vehicles use a main internal combustion engine and a secondary supplemental battery to power their motors. Plug-in hybrid electric vehicles, in contrast to hybrid electric vehicles, use a main large capacity battery and a secondary internal combustion engine to power their motors. Some plug-in hybrid electric vehicles can also run solely on their internal combustion engine without engaging the motors.

Electric vehicles typically include one or more electric machines. The electric machine may be referred to as an electric motor, a traction motor, or a generator. The electric machine may be a permanent magnet machine or an induction machine. Depending on the operating conditions, the electric machine may be capable of working as a motor or a generator. For example, the electric machine may provide torque for vehicle propulsion or act as a generator for converting mechanical power into electrical power using regenerative breaking technology. The electric machine may also provide reduced pollutant emissions since electric vehicles may be operated in either electric mode or hybrid mode to reduce vehicle fuel consumption. While certain embodiments are described in the context of an electric vehicle, it is to be understood that nonautomotive applications are also contemplated, such as manufacturing equipment or power-generation machines.

FIG. 1 depicts a hybrid electric vehicle ("HEV") 112. The HEV 112 includes an electrified propulsion system having one or more electric machines 114 mechanically coupled to a hybrid transmission (not shown). In addition, the hybrid transmission is mechanically coupled to an internal combustion engine 118 (i.e., ICE). The electric machines 114 are arranged to provide propulsion torque as well as slowing torque capability either while the engine 118 is operated or turned off. When the engine 118 is off, the HEV 112 may be operated in an electric-only drive mode using the electric machines 114 as the sole source of propulsion. The hybrid transmission is also mechanically coupled to road wheels to output torque from the electric machines 114 and/or combustion engine 118.

A traction battery or battery pack 124 stores energy that can be used to power the electric machines 114. The battery pack 124 provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high voltage bus 154B and the electric machines 114. According to some examples, the traction battery 124 may provide a DC current while the electric machines 114 operate using a three-phase alternating current (AC). The power electronics module 126 may convert the DC current to a three phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery (e.g., 12V battery). The low-voltage loads 152 may be electrically coupled to the low-voltage bus 156. The low-voltage loads 152 may include various controllers within the vehicle 112. One or more high-voltage electrical loads 158 may be coupled to the high-voltage bus 154. The high-voltage electrical loads 158 may further include compressor and electric heaters.

The traction battery 124 of vehicle 112 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may be an electrical power distribution network or grid as provided by an electric utility company. The EVSE 138 provides circuitry and controls to regulate and manage the transfer of energy between the power source 136 and the vehicle 112. The off-board power source 136 may provide DC or AC electric power to the EVSE 138. The EVSE 138 may have a charge connector 160 for plugging into a charge port 162 of the vehicle 112. The charge port 162 may be electrically coupled to an on-board power conversion module or a charge module 164. The charge module 164 may condition the power supplied from the EVSE 138 to provide proper voltage and current levels to the traction battery 124.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components such as governing electrical flow to and from the one or more electric machines.

Figure 2:
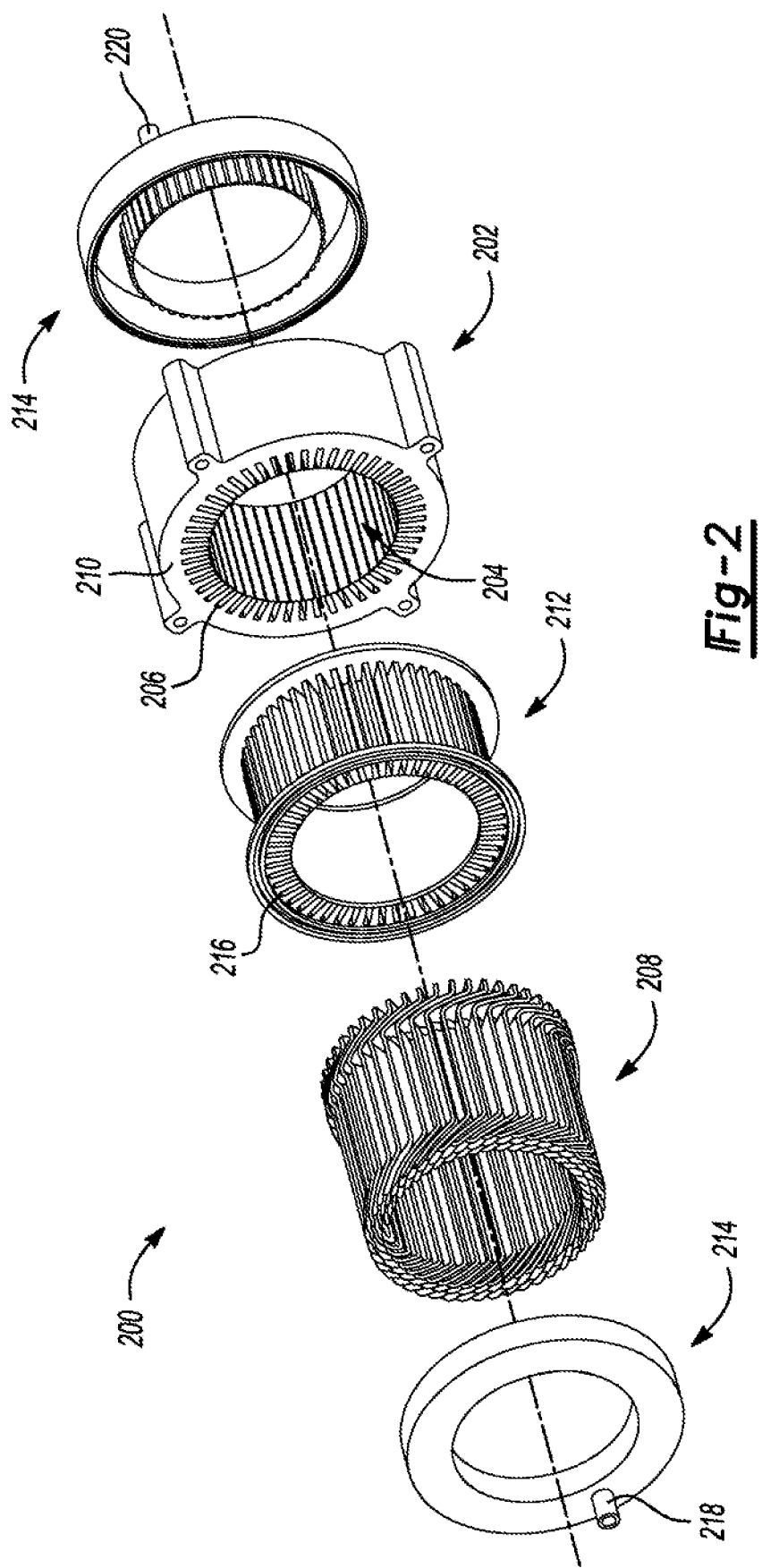
FIG. 2 is an exploded view of a disassembled stator.

An electric machine may comprise a stator and a rotor. FIG. 2 depicts an exploded view of a disassembled stator 200. The stator 200 may comprise a plurality of laminations (not shown) having a front side and a back side. When stacked, the front and back sides are disposed against adjacent front and back sides to form a stator core 202. Each lamination also includes an outer diameter (or outer wall) and an inner diameter (or inner wall). The outer diameters cooperate to define an outer surface of the stator 200, and the inner diameters cooperate to define a cavity 204.

The stator core 202 may include a number of slots 206 spaced about a circumference of the stator core 202. A plurality of windings (also known as coils, wires, or conductors) 208 may be wrapped around the stator 200 and are disposed within the stator slots 206. The windings 208 may be routed throughout the slots 206 in a serpentine fashion to create one or more winding paths to transmit current through the stator 200. Based on the arrangement of the windings 208, portions of the windings may protrude from an end face 210 of the stator core 202. In some specific examples, the windings 208 comprise copper hairpin windings that are routed throughout an iron alloy stator core. A plurality of individual hairpins may be inserted axially through slots 206 and have end portions that protrude beyond end face 210 to adjoin hairpins in adjacent slots.

The stator 200 may also include an overmolded midsection 212 formed about the stator core 202. The midsection 212 may be in-situ injection molded from a polymeric material in order to match the shape and features of the stator core 202. The midsection 212 may also include slots 216 arranged to correspond to slots 206 of the stator core 202 defining a substantially rectangular slot to house windings 208. This substantially rectangular slot defined by the arrangement of slots 216 and slots 206 may be defined by the cooperation of the opposite long faces (long side walls) and opposite short faces (short side walls). The opposite long faces, here, may refer to the length of the slot (commonly known as length of the teeth) extending toward the center of the stator core 200 and the opposite short faces may refer to the width of the slot perpendicular to the opposite long faces.

While the electric machine operates as a motor, current supplied to the windings 208 generates an electromechanical field urging rotation of the rotor. While the electric machine operates as a generator, current is generated in the windings 208 from inertial rotation of the rotor, and energy may be stored in the battery and/or utilized to power other vehicle components. During operation of the electric machine both as a motor and as a generator, heat may be generated throughout the stator core 202 and windings 208. This heat may be removed from the electric machine using a cooling medium (e.g., by circulating transmission oil or other suitable cooling mediums). The cooling medium reduces the temperature of the windings 208 and the stator core 202 thereby increasing the amount of current capable of being provided to the electric machine without causing an undesirable degree of heat generation.

A thermal management assembly may be used to facilitate the cooling medium. Accordingly, an electric machine may include a thermal management assembly that introduces an oil or other dielectric fluid to portions of the electric machine for cooling purposes. In some examples, the oil may be dripped or sprayed onto wires or windings of the electric machine. However, non-uniformity of coolant flow as applied to the windings may reduce cooling efficacy. An air-cooled thermal management assembly may alternatively be provided to assist in managing thermal conditions of an electric machine. Airflow cooling may require a fan or blower to be in fluid flow connection to the end windings to push air thereto for cooling purposes. Such a configuration may also require additional components such as ducting that consume package space.

To address these drawbacks, a closed coolant channel assembly may be provided to assist in managing thermal conditions of the windings of the electric machine. In some specific examples, the closed coolant channel assembly is formed from one or more injection molded polymeric components and mounted to the stator. In some embodiments, the closed coolant channel assembly is formed from injection molded epoxy. The closed coolant channel assembly may define an internal cavity arranged to direct coolant flow to be in thermal communication with windings 208. In some embodiments, for example, a pair of end caps 214 may be provided near the end face 210 of the stator 200. The end caps 214 and the stator core 202 may be arranged with respect to one another to create a fluid seal therebetween and such that coolant routed through a channel is contained therein. In some embodiments, end caps 214 may include one or more inlet ports 218 to receive a coolant flow from a reservoir or other source, and one or more outlet ports 220 to exhaust coolant from the electric machine thermal management system. Coolant flow into stator 200 allows heat removal from the end portions of the windings 208 that protrude beyond the end face 210 of the stator core 202.

Figure 3:
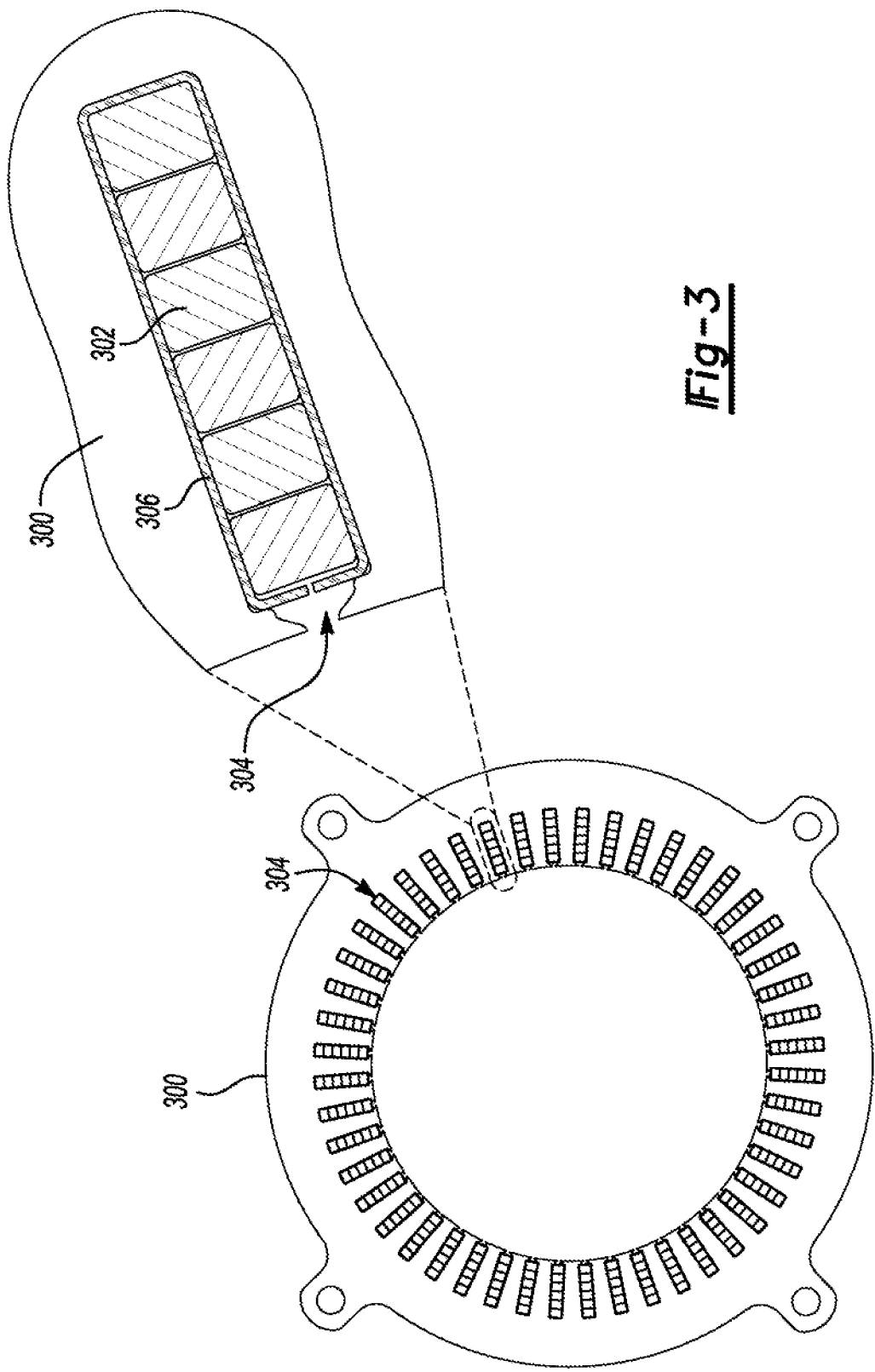
FIG. 3 is an exploded view of a conventional stator slot.

While this is an effective system for heat removal from end windings (i.e., the windings 208 that protrude beyond the end face 210), they may be inefficient at removing heat from the windings as bundled in the grooves and/or stator slots. To remedy that problem direct winding cooling may be used. While direct winding cooling is an effective way to control the temperature of an electric machine, creating room in the grooves and/or stator slots reduces the space available for the material such as steel and copper that contribute directly to torque production. This in turn results in an undesirable increase in the machine size. FIG. 3, for example, shows a conventional stator core 300 comprising at least one winding 302, at least one stator slot 304, and at least one slot liner 306 to provide insulation between the windings 302 and the stator core 300. The slot liner 306 may be made of multiple layers of specialized paper, plastic, or the like for optimal dielectric and mechanical strength. To maximize efficiency, typically, only a minimum clearance necessary to insert the conductors is left as free space.

To further maximize efficiency, encased cooling of an electric machine, explained above, may be adopted. A cavity may be defined via transfer molding to enable encased cooling of an electric machine. This application also discloses creation of a cooling channel inside the stator slot. In some embodiments, for example, an epoxy coated transfer molded mid-section may be used to replace the slot liners.

Figure 4:
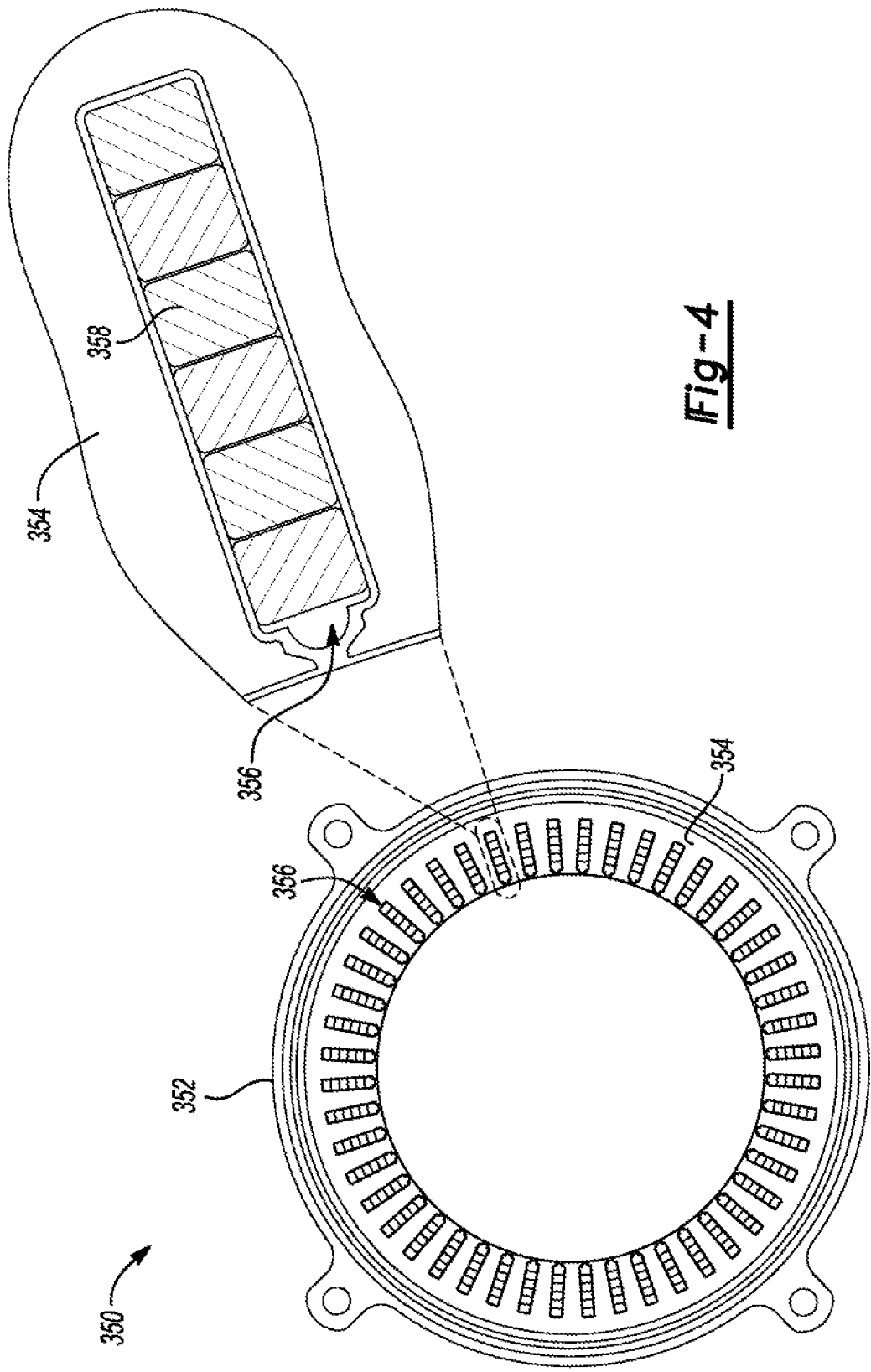
FIG. 4 is an exploded view of a stator slot with transfer molded epoxy.

FIG. 4 shows a detailed view of a stator 350 having a core 352 with a transfer molded epoxy midsection 354. The stator core 352 together with the transfer molded epoxy midsection 354 define a plurality of slots 356. More specifically, FIG. 4 shows a slot 356 detail with rectangular copper conductors 358 occupying the interior of the slot 356. Slot clearance, in embodiments that use epoxy coated transfer molded midsection 354, may be equal to or better than the cases where paper slot liners are used. In embodiments where the stator is varnished (vacuum impregnated) the clearance space is likely to be occupied by the varnish and the only viable cooling passage left would be the semicircular area at the top of the slot. In other embodiments where the stator is not varnished, there is potential for increased NVH. Embodiments herein are intended for both the varnished and non-varnished stator, to improve coolant flow and direct it where it can be most beneficial.

Cooling effects may be further optimized by defining additional cooling paths and by optimal directing of the coolant how to minimize the machine size. More specifically, features inside the stator slot may define additional cooling paths and optimally direct the coolant flow. While these features may be made from/in any appropriate material, such as a variety of impregnated and non-impregnated thermoset polymers, the explanation herein uses an exemplary epoxy coating.

FIG. 5 shows an exemplary embodiment where the feature created—a groove—increases clearance to promote in slot coolant flow. In particular, FIG. 5 shows a stator core 400 with a transfer molded epoxy midsection defining a stator slot 402 having groove 404 to enhance in slot coolant flow. The groove 404 increases the space available for coolant flow thereby aiding heat removal from the stator core 400 and winding 406 without flooding the airgap. The groove 404 may be defined by increasing the size of the stator slot 402, reducing the size of the winding 406, by utilizing an epoxy layer that is thinner than the original slot liner, or any combination thereof. In some embodiments, the groove 404 may extend away from the conductors 406 and toward the stator core 400. While in exemplary embodiment shown in FIG. 5, the groove 404 is defined by/on one short face of the stator slot 402, it is to be understood, that it may be disposed on both opposing short faces, both opposing long faces, one of the opposing long faces, or any combination thereof.

FIG. 6 shows another exemplary embodiment where the features created—grooves and protrusions—increase in slot clearance to promote coolant flow and increase the surface area available for heat removal. In particular, FIG. 6 shows a stator core 410 with a transfer molded epoxy midsection defining a stator slot 412 having at least one groove 414 to enhance in slot coolant flow wherein at least one protrusion 416 is used to further separate one or more windings 418 from each other. The at least one groove 414 may increase the space available for coolant flow thereby aiding heat removal from the stator core 410 and winding 418 without flooding the airgap, while the at least one protrusion 416 helps create spacing or increase the space (path) between the windings 418 to optimize distribution of in slot coolant flow. In some embodiments, the windings 418 are spaced apart to define slits 420 therebetween. The at least one protrusion 416 may be used to increase the space already defined by the slits 420.

In the exemplary embodiment shown in FIG. 6 the at least one protrusion 416 is added midway through the long face of the slot 412 to separate (or further separate) the windings 418 and create a/larger path for coolant flow. It is to be understood, however, that the at least one protrusion 416 need not necessarily be added midway through the long face of the slot 412. Rather, depending on the application at hand, said protrusions 416 may be used anywhere in the slot 412 to separate the windings 418 and create a larger coolant flow path and minimize the temperatures at the hottest locations. In other words, like the grooves 414, the protrusions 416 may be defined by any portion of the midsection immediately adjacent to the slot 412 such that said protrusions 416 are disposed anywhere along the length of the opposite long faces of at least some of the slots 412. In some embodiments, these protrusions extend into at least some of the slots 412 and between the conductors 418 to further establish a gap between the conductors 418 or increase the space already defined by the slits 420. In some embodiments, the windings 418 are in direct contact with the protrusions 416. Similarly, in some embodiments, the protrusions 416, which may be disposed along the opposing long faces of the slot 412 may extend toward each other. Similarly, in the exemplary embodiment shown in FIG. 6, two symmetrical protrusions 416 are shown. It is to be understood, however, that depending on the application at hand, one or more protrusions may be added. Additionally, the protrusions 416 need not be symmetrical.

In the exemplary embodiment shown in FIG. 6, the at least one groove 414 is added to the opposing short faces of the slot 412 to increase the space available for coolant flow and aid the heat removal from the stator core 410 and winding 418. It is to be understood, however, that depending on the application at hand, one or more of the grooves 414 may be used to increase the space available for coolant flow and enhance the heat removal efficiency. Similarly, the grooves 414 need not be symmetrical or of the same size and shape. While the exemplary embodiment shown in FIG. 6 demonstrates two grooves 414 and two protrusions 416, these features are independent and need not be implemented together. Like the protrusions 416 which may be placed anywhere along the length of the long face of the slot 412, the grooves 414 may also be added anywhere along the length of the long face of the slot 412. In other words, this disclosure teaches placement of as many features—grooves and/or protrusions—as needed anywhere across the length of one or both of the short and/or long faces of the slot 412 to adequately remove the heat generated via the passage of electrical current through the windings 418 or the heat generated in the core 410.

FIG. 7A shows another exemplary embodiment. This embodiment shows a stator core 450 with transfer molded epoxy midsection defining a stator slot 452 encasing windings 456 and having at least one groove 454 to enhance in slot coolant flow. In some embodiments, the at least one groove 454 may have the same or different size or shape. In the exemplary embodiment shown in FIG. 7A, for example, small grooves 454 may be added to the epoxy corresponding to the corners of the windings 456 which facilitate the passage of electrical current. Addition of the grooves 454 to the epoxy corresponding to the corners of the windings 456 may promote coolant flow along the slot 452 walls even in the presence of varnish. In other words, in some embodiments the at least one groove 454 may be radially aligned with the slits 458 defined by separation of the conductors 456 such that the aligned grooves 454 and the slits 458 are concentric with respect to the stator 450. FIG. 7B, shows another exemplary embodiment of the present disclosure with an alternative distribution of the grooves 454. This exemplary embodiment demonstrates at least two larger grooves 454 at the opposing short faces of the stator slot 452 with smaller grooves 454 corresponding to both the corners of the windings 456 (i.e., radially aligned with the slits 458 defined by spacing of the conductors 456) and midway between them disposed along the opposing long faces of the stator slot 452.

Figure 8:
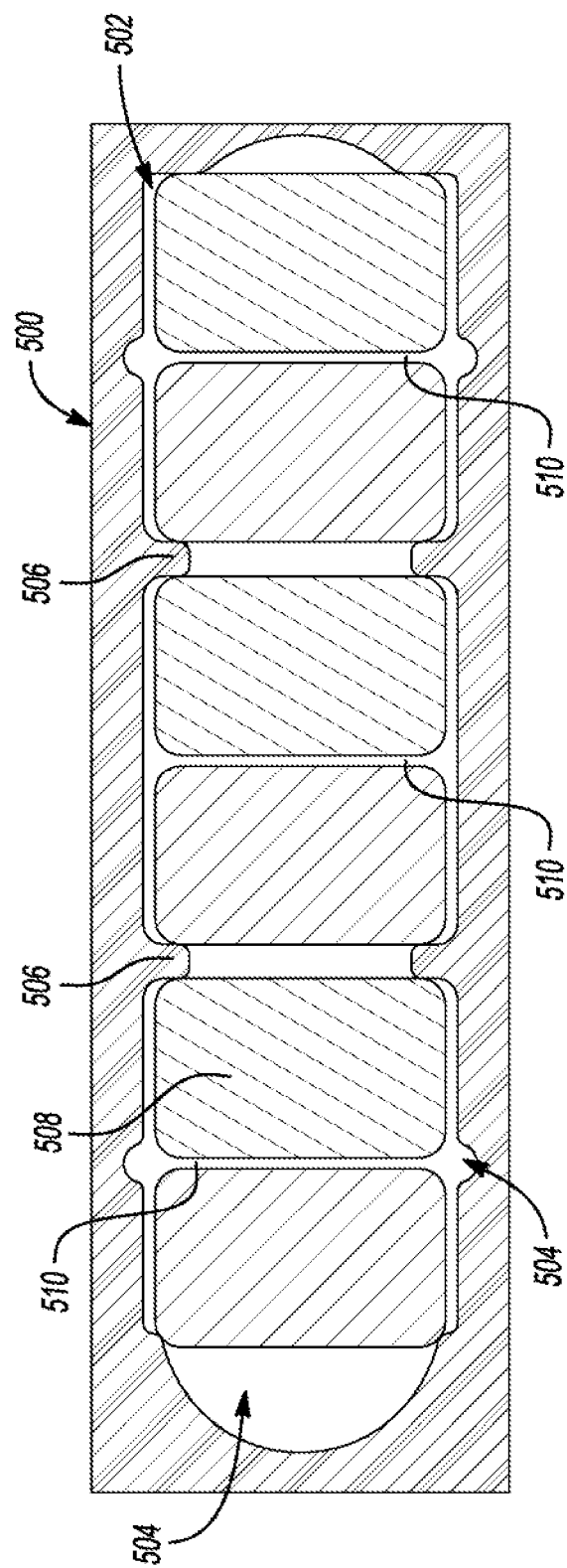
FIG. 8 is an exploded view of an exemplary stator slot with transfer molded epoxy having both groove and protrusion features.

FIG. 8 shows yet another exemplary embodiment. In particular, FIG. 8 shows a stator core 500 with transfer molded epoxy midsection defining a stator slot 502 having at least one groove 504 to enhance in slot coolant flow and at least one protrusion 506 to direct the flow of the coolant, wherein the at least one protrusion 506 may be used to separate (or further increase the existing space between windings 508 referred to as slits 510) one or more windings 508. The at least one groove 504 may increase the space available for coolant flow thereby aiding heat removal from the stator core 500 and winding 508, while the at least one protrusion 506 may help create/increase spacing (path) between the windings 508 to optimize distribution of in slot coolant flow. While the present disclosure may depict the shape of the at least one protrusion 506 as rectangular, it is to be understood, that said protrusions 506 may assume any shape including, but not limited to, triangular or semicircle. Similarly, while the present disclosure may depict the shape of the at least one groove 504 as semicircle, it is to be understood, that said grooves 504 may assume any shape including, but not limited to, triangular, rectangular, or elliptical.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, cost, strength, durability, life cycle cost, marketability, appearance, packaging, size, serviceability, weight, manufacturability, case of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a stator including a core and an over-molded polymeric midsection covering the core and arranged to define a plurality of slots, and a plurality of conductors wound within the slots, wherein portions of the midsection immediately adjacent to the slots define a plurality of protrusions disposed on opposite long faces of the slots, wherein the protrusions extend into the slots and circumferentially between some of the conductors to establish a circumferential gap between the some of the conductors configured to direct coolant between the some of the conductors, and wherein the portions of the midsection immediately adjacent to the slots further define at least one groove on short faces of the slots extending away from the conductors and toward the core, and at least one groove on the opposite long faces circumferentially between other of the conductors extending away from the other of the conductors and toward the core.

2. The electric machine of claim 1, wherein the some of the conductors are in direct contact with the protrusions.

3. The electric machine of claim 1, wherein for each of the slots, the protrusions on the opposite long faces extend toward each other.

4. The electric machine of claim 1, wherein the at least one groove has a semicircular, rectangular, elliptical, or triangular shape.

5. A stator comprising:
a core;
a polymeric over-molded midsection covering the core, wherein the core and the over-molded midsection are arranged to define a plurality of slots; and
a plurality of conductors wound within the slots, wherein portions of the midsection immediately adjacent to the slots define a plurality of grooves, some disposed on at least one long face circumferentially between the conductors of at least one of the slots and others disposed on at least one short face of the at least one of the slots, extending away from the conductors and toward the core to facilitate coolant flow.

6. The stator of claim 5, wherein the plurality of grooves has a semicircular, rectangular, elliptical, or triangular shape.

7. The stator of claim 5, wherein the portions of the midsection immediately adjacent to the slots further define a plurality of protrusions disposed on opposite long faces of at least some of the slots and wherein the protrusions extend into the at least some of the slots and circumferentially between some of the conductors to establish a circumferential gap between the some of the conductors configured to direct coolant between the some of the conductors.

8. The stator of claim 7, wherein the plurality of conductors are in direct contact with the plurality of protrusions.

9. The stator of claim 7, wherein for each of the slots, the protrusions on the opposite long faces extend toward each other.

10. A stator comprising:
a core;
a polymeric over-molded midsection covering the core, wherein the core and the over-molded midsection are arranged to define a plurality of slots; and
a plurality of conductors wound within the slots, wherein portions of the midsection immediately adjacent to the slots define (i) at least one groove, disposed on at least one short face of at least some of the slots, extending away from the conductors and toward the core (ii) at least one groove, disposed on at least one long face of the at least some of the slots circumferentially between the conductors, extending away from the conductors and toward the core, and (iii) at least one groove, disposed on the at least one long face of the at least some of the slots circumferentially adjacent to the conductors, extending away from the conductors and toward the core.

11. The stator of claim 10, wherein the grooves have a semicircular, rectangular, elliptical, or triangular shape.

12. The stator of claim 10, wherein the portions of the midsection immediately adjacent to the slots further define a plurality of protrusions disposed on opposite long faces of at least some of the slots and wherein the protrusions extend into the at least some of the slots and circumferentially between some of the conductors to establish a circumferential gap between the some of the conductors configured to direct coolant between the some of the conductors.

13. The stator of claim 12, wherein the plurality of conductors are in direct contact with the plurality of protrusions.

14. The stator of claim 12, wherein for each of the slots, the protrusions on the opposite long faces extend toward each other.

* * * * *